(12) United States Patent
Park

(10) Patent No.: US 8,879,450 B2
(45) Date of Patent: Nov. 4, 2014

(54) ENHANCING PS-POLL FOR LOW-POWER WIFI

(75) Inventor: Minyoung Park, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 267 days.

(21) Appl. No.: 13/074,148

(22) Filed: Mar. 29, 2011

(65) Prior Publication Data

US 2012/0250596 A1 Oct. 4, 2012

(51) Int. Cl.
*H04H 20/71* (2008.01)
(52) U.S. Cl.
USPC ............................ 370/311; 370/312; 370/252
(58) Field of Classification Search
USPC .......................................... 370/311, 312, 252
See application file for complete search history.

(56) References Cited

U.S. PATENT DOCUMENTS

| | | | |
|---|---|---|---|
| 8,144,707 B2 | 3/2012 | Zhang et al. | |
| 2001/0031626 A1* | 10/2001 | Lindskog et al. | 455/67.3 |
| 2003/0231597 A1* | 12/2003 | Hester et al. | 370/252 |
| 2007/0104179 A1 | 5/2007 | Srinivasan et al. | |
| 2008/0144559 A1* | 6/2008 | Griswold et al. | 370/311 |
| 2009/0257370 A1* | 10/2009 | Chen | 370/311 |

FOREIGN PATENT DOCUMENTS

EP 2169986 A2 * 3/2010

OTHER PUBLICATIONS

Qi, Emily, "BSS Max Idle Period and Sleep Interval", Doc.: IEEE 802.11-10/1326r0, Nov. 8, 2010, 4 pages.
International Search Report and Written Opinion received for PCT Patent Application No. PCT/US2012/029343, mailed on Oct. 12, 2012, 9 pages.
Office Action received for Japanese Patent Application No. 2012-011100, mailed Feb. 19, 2013, 3 pages including 2 pages English translation.
Nalinen, J., "Power save buffering of management frames", IEEE P802.11 Wireless LANs, <http://mentor.ieee.org/802.11/dcn/09/11-09-0003-040000m-power-save-buffering-of-management-frames.doc>, Mar. 2009.
Office Action received for Chinese Patent Application No. 201210100334.7, mailed Jun. 4, 2014, 16 pages including 9 pages English translation.

* cited by examiner

*Primary Examiner* — Dang Ton
*Assistant Examiner* — Pamit Kaur
(74) *Attorney, Agent, or Firm* — Kacvinsky Daisak Bluni PLLC

(57) ABSTRACT

Various embodiments are generally directed to an apparatus, method and other techniques for a network controller to obtain a group-addressed packet destined for multiple subscriber stations (SSs) belonging to a group. The network controller to determine that a particular SS in the group is currently unable to receive group-addressed packets due to being in a sleep mode, transmit the group-addressed packet and retain the group-addressed packet in a buffer. After receiving a poll from the particular SS, the network controller is to retransmit the group-addressed packet.

27 Claims, 5 Drawing Sheets

ENHANCING PS-POLL FOR LOW-POWER WIFI

BACKGROUND

A wireless device waking from a power save mode may poll the network controller to see if the network controller has buffered unicast frames that are addressed solely for that wireless device. However, broadcast and multicast frames are not buffered until requested, but are transmitted immediately after DTIM beacons. Under current standards, if the wireless device is part of a multicast group it must wake up at every DTIM interval to receive any broadcast/multicast frames for its group. DTIM beacons are typically transmitted every 200-400 msec, requiring a wireless device in the power save mode to wake up every 200-400 msec to learn if it has any broadcast or multicast frames to receive. For wireless devices that communicate frequently, this may be a reasonable tradeoff between saving battery power and obtaining all such frames. But for battery-powered sensor devices that need to only wake up occasionally (e.g., tens of minutes to hours) to communicate sensor data, waking up multiple times per second can severely reduce battery life and thereby increase maintenance costs (e.g., replacing/recharging the battery frequently) or reduce product life (e.g., for disposable sensors when replacing/recharging the battery is not feasible).

BRIEF DESCRIPTION OF THE DRAWINGS

Some embodiments of the invention may be better understood by referring to the following description and accompanying drawings that are used to illustrate embodiments of the invention. In the drawings.

DETAILED DESCRIPTION

Figure 1:
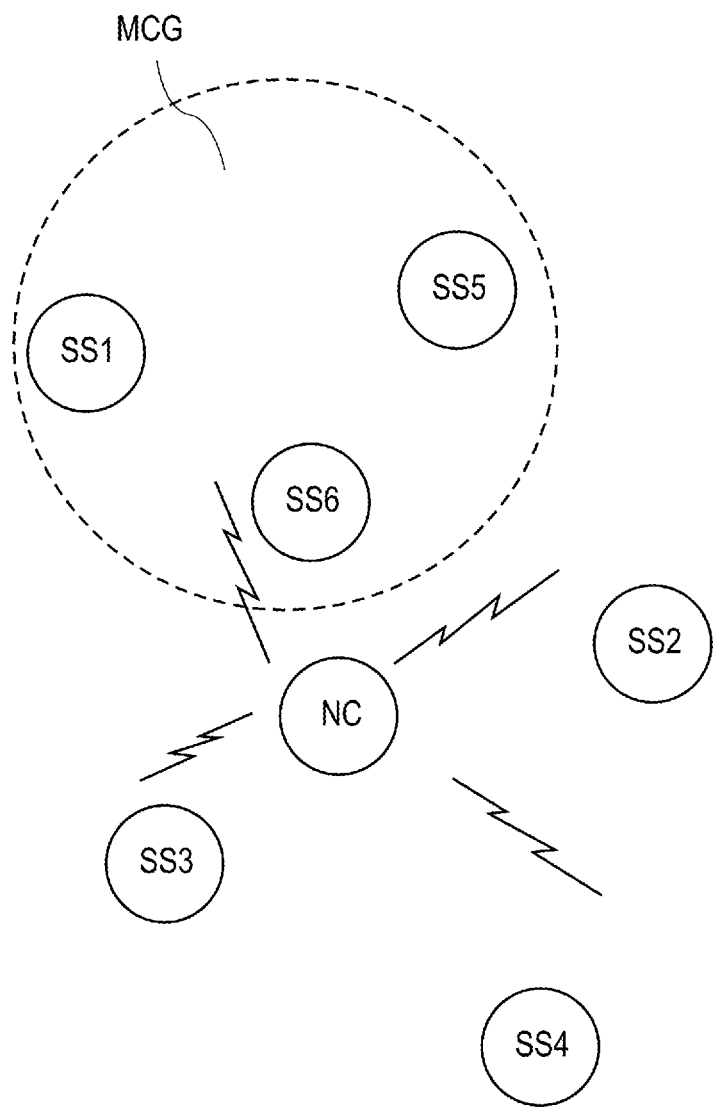
FIG. 1 shows a wireless communications network in which various communications devices communicate with each other wirelessly, according to an embodiment of the invention.

In the following description, numerous specific details are set forth. However, it is understood that embodiments of the invention may be practiced without these specific details. In other instances, well-known circuits, structures and techniques have not been shown in detail in order not to obscure an understanding of this description.

References to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the following description and claims, the terms "coupled" and "connected," along with their derivatives, may be used. It should be understood that these terms are not intended as synonyms for each other. Rather, in particular embodiments, "connected" is used to indicate that two or more elements are in direct physical or electrical contact with each other. "Coupled" is used to indicate that two or more elements co-operate or interact with each other, but they may or may not have intervening physical or electrical components between them.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

Various embodiments of the invention may be implemented in one or any combination of hardware, firmware, and software. The invention may also be implemented as instructions contained in or on a non-transitory computer-readable medium, which may be read and executed by one or more processors to enable performance of the operations described herein. Such a computer-readable medium may include any tangible mechanism for storing information in a form readable by one or more computers, such as but not limited to read only memory (ROM); random access memory (RAM); magnetic disk storage media; optical storage media; a flash memory device, etc.

The term "wireless" may be used to describe circuits, devices, systems, methods, techniques, communications channels, etc., that communicate data by using modulated electromagnetic radiation through a non-solid medium. The term does not imply that the associated devices do not contain any wires. A wireless device may comprise at least one antenna, at least one radio, at least one memory, and at least one processor, where the radio transmits signals through the antenna that represent data and receives signals through the antenna that represent data, while the processor may process the data to be transmitted and the data that has been received. The processor may also process other data which is neither transmitted nor received.

As used within this document, the term "network controller" is intended to cover devices that schedule and control, at least partially, wireless communications by other devices in the network. A network controller may also be known as a base station (BS), access point (AP), central point (CP), or any other term that may arise to describe the functionality of a network controller.

As used within this document, the term "subscriber station" (SS) is intended to cover those devices whose wireless communications are at least partially scheduled and controlled by the network controller. A subscriber station may also be known as a mobile station (MS), mobile device (MD), STA, user equipment (UE), or any other term that may arise to describe the functionality of an SS. Some types of SS's may be able to communicate effectively while moving, but other may not.

As used within this document, a 'sleep mode' or 'sleep state' is a condition in which a wireless communications device may save power by shutting down enough operational functions that it cannot transmit or receive wireless communications. The various ways in which this shutdown may be accomplished are beyond the scope of this document.

Within this document, several types of addressing techniques are described, each indicating how the intended destination devices are indicated in the communication. A unicast address is an address intended to be recognized by a single destination device, and that destination device is the intended recipient of the packet that is so addressed.

A multicast address is an address intended to be recognized by multiple destination devices, and those destination devices are the intended recipients of the packet that is so addressed. One or more previous communications may need to take place to notify the SS's in a multicast group that they are a part of that group and are to recognize that multicast address, so that each will receive the packet. Some packets may contain multiple unicast addresses, with each addressed device expected to recognize and receive the same packet. For the purposes of this document, these are considered multicast packets, since the effect is the same except that each device doesn't have to recognize two different addresses (its own and the multicast address).

A 'broadcast' packet is a packet that is intended to be received by any device that is able to receive it. A broadcast packet may typically contain all 1's as a destination address, indicating to all receivers it is intended as a broadcast. However, in other embodiments, other techniques may be used to indicate a broadcast.

A group-addressed packet is a packet that is a multicast packet or a broadcast packet, but is not a unicast packet.

FIG. 1 shows a wireless communications network in which various communications devices communicate with each other wirelessly, according to an embodiment of the invention. A network controller NC may provide overall control for communications in the network. In the illustrated embodiment, subscriber stations SS1-SS6 are associated with network controller NC, which has combined SS1, SS5, and SS6 into a multicast group MCG that will all recognize and respond to the same multicast address. (For ease of illustration, the members of the multicast group are all shown in close physical proximity, but this may not be necessary or typical.) In some embodiments the NC may transmit and receive in an omni-directional manner, while in other embodiments the NC may use more directional communications. In some embodiments, some or all of the SS's may be battery powered sensor devices that report on various sensed parameters at widely spaced intervals in time, but this should not be considered a limitation.

Figure 2:
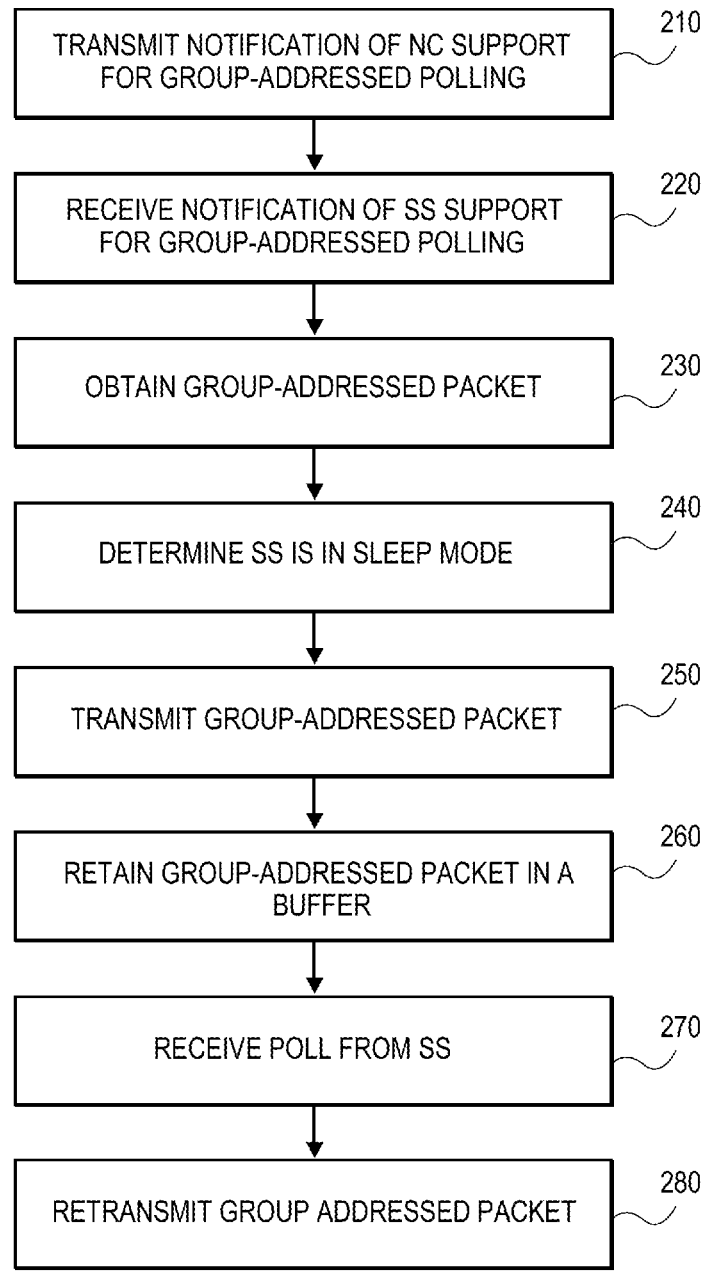
FIG. 2 shows a flow diagram of a method followed by a network controller to perform group-addressed polling communication involving a sleep mode, according to an embodiment of the invention.

FIG. 2 shows a flow diagram of a method followed by a network controller to perform group-addressed polling communication involving a sleep mode, according to an embodiment of the invention. This procedure may allow the network controller to announce that it supports such communication, learn that a particular SS intends to use it, and then perform the required operations with that SS. The process may begin at 210 when the NC transmits a notification that it supports the group-addressed polling techniques described herein. Such notification may take any feasible form, such as in a beacon, a probe response, or as part of the association process, but other forms may also be used without departing from the scope of various embodiments of the invention.

At 220 the NC may receive notification from a particular SS that the SS also supports this group-addressed polling and agrees to use it. Again, this notification may take any feasible form, such as in a response to a beacon or as part of the association process, but other forms may also be used without departing from the scope of various embodiments of the invention. In general, if either of these notifications is not received, the described group-addressed polling technique will not be used for communications between these two devices.

Subsequent to the agreement established at 210, 220, the NC may obtain a group-addressed packet at 230 that is destined for a group of SS's that includes the particular SS. This group-addressed packet may be obtained in any feasible manner, such as being received from another device for forwarding to the group, being assembled by the NC from various other received packets, or being constructed from information that the NC initiates.

If the particular SS is awake and able to receive the group-addressed packet, the SS may transmit the group-addressed packet and assume that every SS in the group, including the particular SS, is able to receive it. However, at 240 the NC may determine that the particular SS is in a sleep mode and will therefore not be able to receive the transmitted packet. Such determination may be accomplished in any feasible manner, but one technique is for the particular SS to notify the NC that the particular SS is entering a sleep mode. The particular SS may or may not include information about how long the sleep mode will last.

Even if the particular SS is in a sleep mode, the NC may transmit the group-addressed packet at 250 for the benefit of the other SS's in the group that are awake and able to receive the packet. The NC may then retain the packet in a buffer at 260 for a subsequent retransmission.

Some time later, at 270 the NC may receive a poll from the particular SS requesting any buffered packets that the NC has waiting for that SS. This is a notification that the SS is now awake and ready to receive those packets. In a conventional system, only unicast packets would have been buffered, but in this system the group-addressed packets were also buffered. So in addition to transmitting the buffered unicast packets in response to this poll, the NC may also transmit the buffered group-addressed packets at 280.

At some point, the retained group-addressed packets may be deleted from the buffer. In some embodiments, a previously established time period may be communicated that defines the maximum time period the retained packets can remain in the buffer before being deleted. If the SS does not wake up and request those packets before the expiration of that time period, they may be deleted from the buffer and the SS may not be able to receive them at all. On the other hand, if the SS wakes up and requests those packets before expiration of the maximum time period, the NC may delete the retained packet from the buffer after the packet is retransmitted, even if the time period has not expired.

Figure 3:
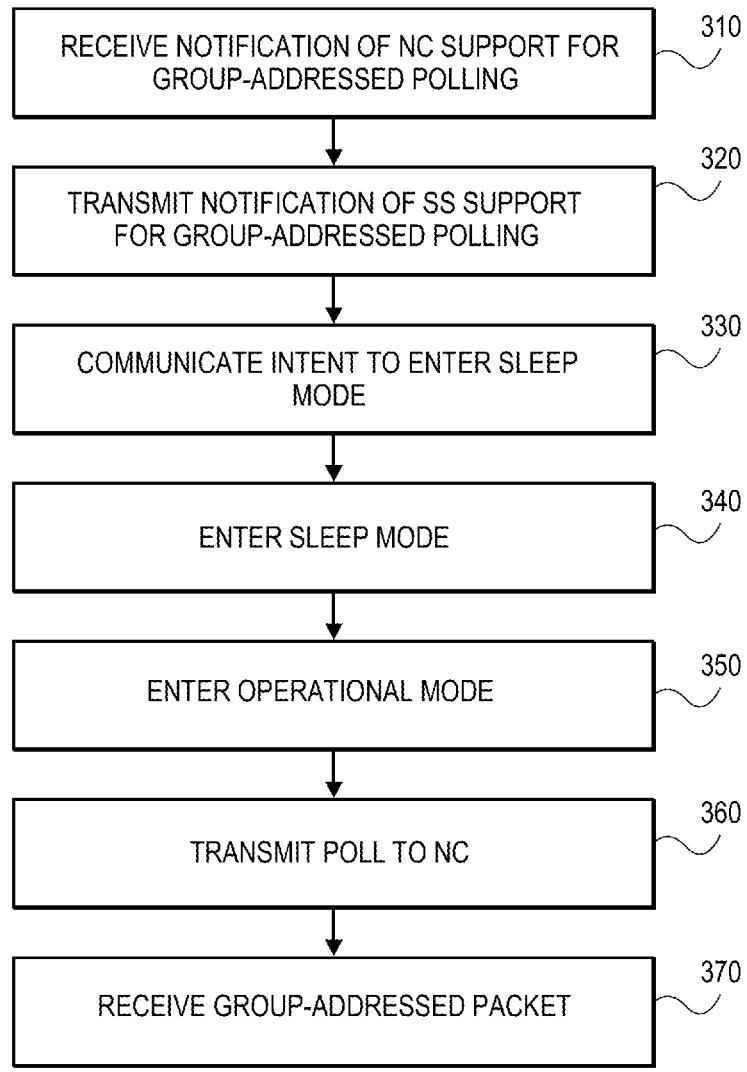
FIG. 3 shows a flow diagram of a method followed by a subscriber station to perform group-addressed polling communication involving a sleep mode, according to an embodiment of the invention.

FIG. 3 shows a flow diagram of a method followed by a subscriber station to perform group-addressed polling communication involving a sleep mode, according to an embodiment of the invention. This process may be complementary to the process followed by the NC in FIG. 2. The process may begin at 310 when the SS receives a notification from the NC that the NC supports the group-addressed polling techniques described herein. Such notification may take any feasible form, such as in a beacon, a probe response, or as part of the association process, but other forms may also be used without departing from the scope of various embodiments of the invention.

At 320 the SS may transmit a notification to the NC that it also supports such group-addressed polling and may follow that procedure when waking from subsequent sleep states. Again, this notification may take any feasible form. Both notifications may be needed before the group-addressed polling techniques will be used by these two devices.

Later, when the SS has no data to communicate, it may enter a sleep mode at 340. In some embodiments it may first notify the NC at 330 that it is entering the sleep mode. After a sufficient period of time in the sleep mode, the SS may wake up and enter an operational mode at 350. Various techniques may be used to determine how long the SS is in the sleep mode. Those techniques are beyond the scope of this document, and are not further discussed here.

After waking, the SS may transmit a poll to the NC at 360, requesting any buffered packets that the NC has waiting for the SS, and at 370 it may receive the buffered group-addressed packets in response to that poll. In some embodiments, a single poll may request both unicast and group-addressed packets, but in other embodiments each type of packet may require a separate poll.

Figure 4:
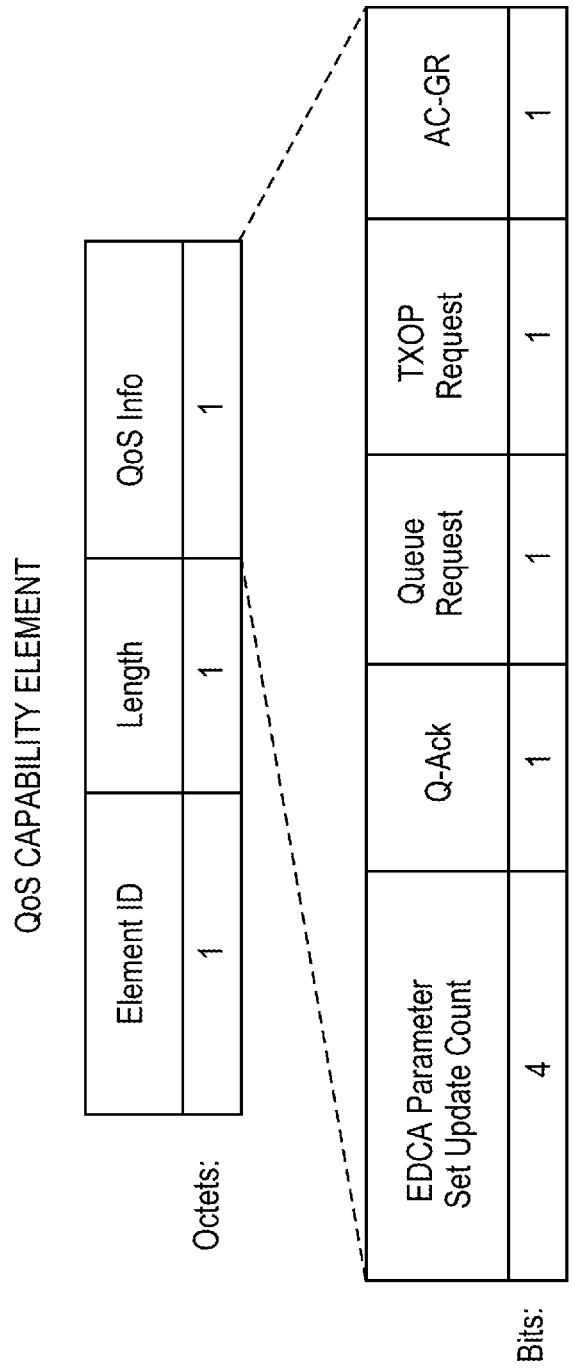
FIG. 4 shows a format for indicating support by a network controller for group-addressed polling techniques involving a sleep mode by a subscriber station, according to an embodiment of the invention.

FIG. 4 shows a format for indicating support by a network controller for group-addressed polling techniques involving a sleep mode by a subscriber station, according to an embodiment of the invention. The indicated information may be transmitted in the form of an Information Element (IE), with the format of an Element ID, a Length field, and a Data field that carries the contents of the IE that are being conveyed. In many cases the Data field may have a variable length, so the Length field may define where the IE ends. The Element ID may define the type of IE it is, which in turn defines how the contents of the Data field should be interpreted. In the particular IE shown in the upper part of FIG. 4, labeled as a QoS Capability Element, the Data field is indicated as a QoS Info field, whose contents are further defined in the lower part of FIG. 4. The flexible nature of IEs allows them to be inserted into various types of packets.

In previous versions of a QoS Info subfield of a QoS Capability Element, the final bit has been reserved for unspecified future use. In this embodiment, that bit is being used to indicate that the NC supports group-addressed polling techniques. The label AC-GR is shown (Access Category-GRoup addressed frame), but any suitable label may be used. The bit being in one state indicates the NC supports this technique, while the bit being in the other state indicates the NC does not. The remaining fields are not part of communicating this capability, may take other forms, and are not further described.

Figure 5:
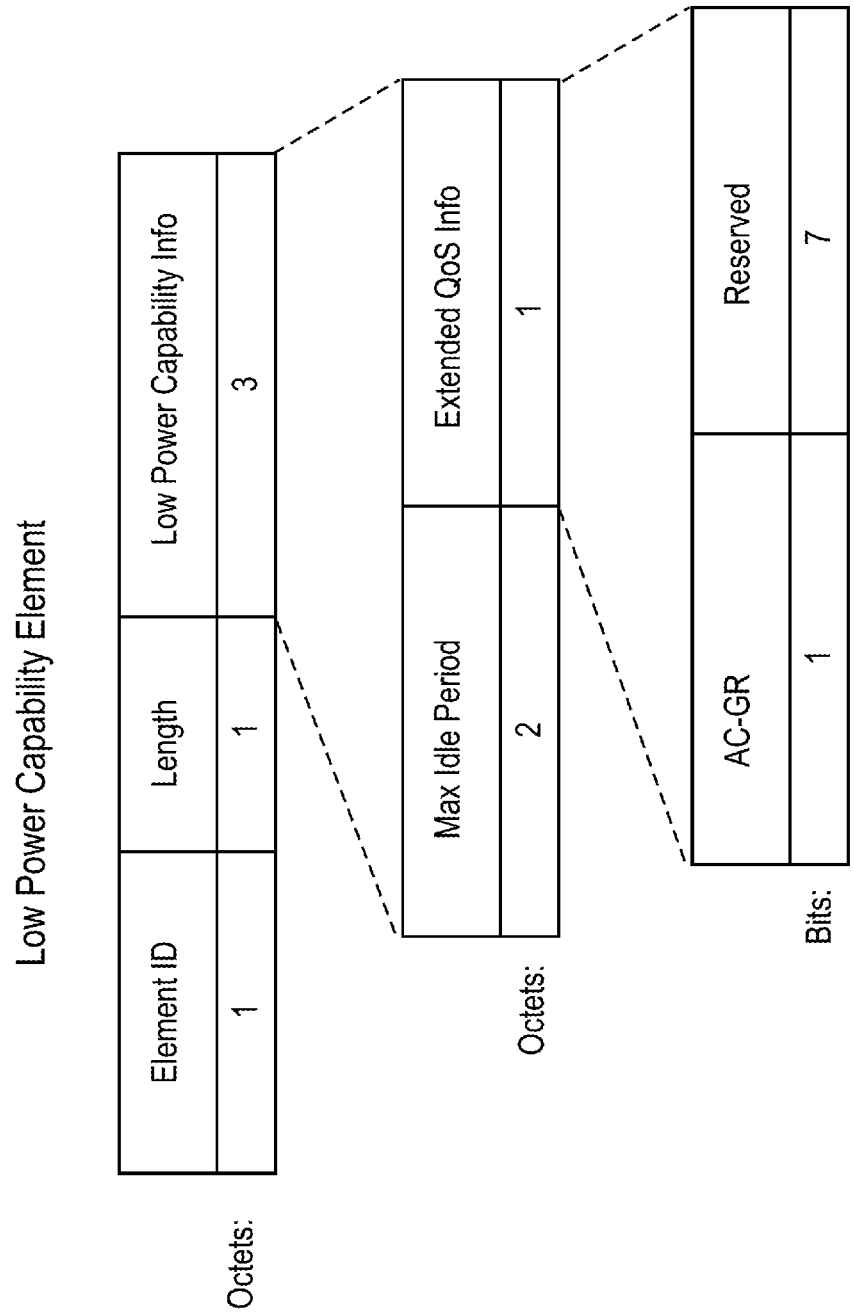
FIG. 5 shows a format for indicating support by a subscriber station for group-addressed polling techniques involving a sleep mode, according to an embodiment of the invention.

FIG. 5 shows a format for indicating support by a subscriber station for group-addressed polling techniques involving a sleep mode, according to an embodiment of the invention. The indicated information may be transmitted in the form of an Information Element (IE), whose general format was covered in the description for FIG. 4. The illustrated IE in FIG. 5 is labeled a Low Power Capability Element, and the Data field is labeled a Low Power Capability Info field, although other labels may be used instead. The contents of the Low Power Capability Info field are shown as containing a Max Idle Period field and an Extended QoS Info field. The Max Idle Period field may indicate the maximum period the NC may wait before deleting retained packets from its buffer. The Extended QoS Info field may contain the AC-GR indicator. As indicated in FIG. 4, this bit may be used to show whether or not the transmitting device supports group-addressed polling techniques as described in this document.

If the NC shows it supports group-addressed polling techniques as described in FIG. 4, and the SS shows it supports group-addressed polling techniques as described in FIG. 5, then the NC may retain group-addressed packets intended for the SS, and the SS may poll for those retained packets after awaking from a sleep state. If either the NC or SS does not show such support, then this technique may not be used. In such a case, the SS may wake up for each DTIM interval to listen for any group-addressed packets, and polls by the SS make only retrieve retained unicast packets.

The foregoing description is intended to be illustrative and not limiting. Variations will occur to those of skill in the art. Those variations are intended to be included in the various embodiments of the invention, which are limited only by the scope of the following claims.

What is claimed is:

1. A method, comprising:
obtaining, by a network controller, a group-addressed packet destined for multiple subscriber stations (SSs) belonging to a group to receive the group-addressed packet;
determining that a particular SS in the group is currently unable to receive group-addressed packets due to being in a sleep mode;
transmitting the group-addressed packet to the multiple SSs belonging to the group to receive the group-addressed packet when the particular SS in the group to receive the group-addressed packet is in the sleep mode;
retaining, by the network controller, the group-addressed packet in a buffer;
receiving a poll from the particular SS; and
retransmitting the group-addressed packet in response to said receiving the poll.

2. The method of claim 1, further comprising transmitting, prior to said determining, a notification that the network controller supports said retaining and retransmitting group-addressed packets.

3. The method of claim 2, wherein the notification is contained in a field of a QoS Compatibility information element.

4. The method of claim 1, further comprising receiving from the particular SS, prior to said determining, a notification that the particular SS supports polling for group-addressed packets.

5. The method of claim 4, wherein the notification is contained in a field of a Low Power Capability information element.

6. A network controller device for communicating in a wireless communications network, the device having a processor, a memory, and a radio, the network controller device to:
obtain a group-addressed packet destined for multiple subscriber stations (SSs) belonging to a group to receive the group-addressed packet;
determine that a particular SS in the group is currently unable to receive group-addressed packets due to being in a sleep mode;
transmit the group-addressed packet to the multiple SSs belonging to the group to receive the group-addressed packet when the particular SS in the group to receive the group-addressed packet is in the sleep mode;
retain the group-addressed packet in a buffer;
receive a poll from the particular SS; and
retransmit the group-addressed packet in response to said receiving the poll.

7. The device of claim 6, the network controller device to transmit, prior to said determining, a notification that the device supports said retaining and retransmitting group-addressed packets.

8. The device of claim 7, wherein the notification is to be contained in a field of a QoS Compatibility information element.

9. The device of claim 6, the network controller device to receive from the particular SS, prior to said determining, a notification that the particular SS supports polling for group-addressed packets.

10. The device of claim 9, wherein the notification is to be contained in a field of a Low Power Capability information element.

11. A computer-readable non-transitory storage medium that contains instructions, which when executed by one or more processors result in performing operations comprising:
obtaining, by a network controller, a group-addressed packet destined for multiple subscriber stations (SSs) belonging to a group to receive the group-addressed packet;
determining that a particular SS in the group is currently unable to receive group-addressed packets due to being in a sleep mode;
transmitting the group-addressed packet to the multiple SSs belonging to the group to receive the group-addressed packet when the particular SS in the group to receive the group-addressed packet is in the sleep mode;
retaining, by the network controller, the group-addressed packet in a buffer;
receiving a poll from the particular SS; and
retransmitting the group-addressed packet in response to said receiving the poll.

12. The medium of claim 11, wherein the operations further comprise transmitting, prior to said determining, a notification that the network controller supports said retaining and retransmitting group-addressed packets.

13. The medium of claim 12, wherein the notification is contained in a field of a QoS Compatibility information element.

14. The medium of claim 11, wherein the operations further comprise receiving from the particular SS, prior to said determining, a notification that the particular SS supports polling for group-addressed packets.

15. The medium of claim 14, wherein the notification is contained in a field of a Low Power Capability information element.

16. A method of communicating by a device in a wireless communications network, comprising:
entering a sleep mode;
waking from the sleep mode;
transmitting a poll to a network controller requesting buffered packets; and
receiving the buffered packets in response to the poll;
wherein at least one of the buffered packets is a group-addressed packet retransmitted subsequent to waking from the sleep mode and previously transmitted to other devices when the device was in the sleep mode; receiving from the network controller, prior to said entering, a notification that the network controller supports retaining and retransmitting group-addressed packets.

17. The method of claim 16, wherein the notification is contained in a field of a QoS Compatibility information element.

18. The method of claim 16, further comprising transmitting to the network controller, prior to said entering, a notification that the device supports polling for group-addressed packets.

19. The method of claim 18, wherein the notification is contained in a field of a Low Power Capability information element.

20. A wireless communications device having a processor, a memory, and a radio, the wireless communications device to:
enter a sleep mode;
wake from the sleep mode;
transmit a poll to a network controller requesting buffered packets; and
receive the buffered packets in response to the poll;
wherein at least one of the buffered packets is to be a group-addressed packet retransmitted subsequent to the wireless communications device waking from the sleep mode and previously transmitted to other devices when the wireless communications device was in the sleep mode; the wireless communications device to receive from the network controller, prior to said entering, a notification that the network controller supports retaining and retransmitting group-addressed packets.

21. The method of claim 20, wherein the notification is to be contained in a field of a QoS Compatibility information element.

22. The device of claim 20, the wireless communications device to transmit to the network controller, prior to said entering, a notification that the device supports polling for group-addressed packets.

23. The device of claim 22, wherein the notification is to be contained in a field of a Low Power Capability information element.

24. A computer-readable non-transitory storage medium that contains instructions, which when executed by one or more processors result in performing operations comprising:
entering a sleep mode;
waking from the sleep mode;
transmitting a poll to a network controller requesting buffered packets; and
receiving the buffered packets in response to the poll;
wherein at least one of the buffered packets is a group-addressed packet retransmitted subsequent to waking from the sleep mode and previously transmitted to other devices when the device was in the sleep mode and previously transmitted to other devices when the one or more processors were in the sleep mode; wherein the operations further comprise receiving from the network controller, prior to said entering, a notification that the network controller supports retaining and retransmitting group-addressed packets.

25. The method of claim 24, wherein the notification is contained in a field of a QoS Compatibility information element.

26. The medium of claim 24, wherein the operations further comprise transmitting to the network controller, prior to said entering, a notification that the device supports polling for group-addressed packets.

27. The medium of claim 26, wherein the notification is contained in a field of a Low Power Capability information element.

* * * * *